(12) United States Patent
Suwald

(10) Patent No.: US 11,386,192 B2
(45) Date of Patent: Jul. 12, 2022

(54) AUTHENTICATION TOKEN AND METHOD OF OPERATING THE SAME

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 119 days.

(21) Appl. No.: 16/450,132

(22) Filed: Jun. 24, 2019

(65) Prior Publication Data

US 2020/0004947 A1    Jan. 2, 2020

(30) Foreign Application Priority Data

Jul. 2, 2018  (EP) .................................... 18181228

(51) Int. Cl.

| | |
|---|---|
| G06F 21/35 | (2013.01) |
| H04L 29/06 | (2006.01) |
| H04W 48/16 | (2009.01) |
| H04W 24/00 | (2009.01) |
| H04L 7/04 | (2006.01) |
| H04L 9/40 | (2022.01) |

(52) U.S. Cl.
CPC ............. *G06F 21/35* (2013.01); *H04L 7/04* (2013.01); *H04L 63/0861* (2013.01); *H04W 24/00* (2013.01); *H04W 48/16* (2013.01)

(58) Field of Classification Search
CPC ....... G06F 21/35; H04L 7/04; H04L 63/0861; H04W 24/00; H04W 48/16
See application file for complete search history.

(56) References Cited

U.S. PATENT DOCUMENTS

| 7,992,789 B2 | 8/2011 | Borracci |
| 2006/0284857 A1 | 12/2006 | Oh |

(Continued)

FOREIGN PATENT DOCUMENTS

| EP | 3 109 793 A1 | 12/2016 |
| EP | 3 217 316 A1 | 9/2017 |

OTHER PUBLICATIONS

EP Application 18151280.7; not yet published; 43 Pages (Jan. 11, 2018).

(Continued)

*Primary Examiner* — Yonas A Bayou

(57) ABSTRACT

In accordance with a first aspect of the present disclosure, an authentication token is provided, comprising: a communication unit for contactless communication between the token and an external device; an energy storage unit for storing energy; a biometric capturing unit for capturing at least one biometric sample; a processing unit for processing the biometric sample captured by the biometric capturing unit; wherein the token further comprises a synchronization unit configured to: determine a communication status of the communication unit; determine a power supply capability of the energy storage unit; adjust a processing speed of the processing unit in dependence on said communication status and said power supply capability. In accordance with a second aspect of the present disclosure, a corresponding method of operating an authentication token is conceived. In accordance with a third aspect of the present disclosure, a corresponding computer program is provided.

16 Claims, 15 Drawing Sheets

(56) References Cited

U.S. PATENT DOCUMENTS

| | | | |
|---|---|---|---|
| 2011/0221566 A1* | 9/2011 | Kozlay | H04L 63/0492 340/5.52 |
| 2012/0075062 A1* | 3/2012 | Osman | H04L 63/0853 340/5.61 |
| 2013/0086389 A1 | 4/2013 | Suwald | |
| 2013/0324166 A1* | 12/2013 | Mian | H04W 4/029 455/457 |
| 2014/0059213 A1* | 2/2014 | Ollikainen | G06Q 30/0282 709/224 |
| 2014/0108252 A1* | 4/2014 | Itwaru | G06Q 20/3276 705/44 |
| 2015/0121499 A1* | 4/2015 | Suwald | G06F 21/32 726/7 |
| 2015/0350225 A1* | 12/2015 | Perold | H04W 4/02 726/4 |
| 2015/0355893 A1* | 12/2015 | Luk | H04L 67/20 717/178 |
| 2015/0356289 A1* | 12/2015 | Brown | H04L 63/0884 726/7 |
| 2016/0055322 A1* | 2/2016 | Thomas | H04L 63/0876 726/7 |
| 2016/0292672 A1* | 10/2016 | Fay | G06Q 20/3827 |
| 2016/0330027 A1* | 11/2016 | Ebrahimi | H04L 9/3239 |
| 2016/0373440 A1* | 12/2016 | Mather | G06F 21/6218 |
| 2017/0220842 A1 | 8/2017 | Thompson et al. | |
| 2017/0286789 A1 | 10/2017 | Wintergerst Lavin et al. | |
| 2017/0300799 A1 | 10/2017 | Breed et al. | |
| 2019/0034378 A1 | 1/2019 | Suwald et al. | |

OTHER PUBLICATIONS

EP Application 18162660.7; not yet published; 25 Pages (Mar. 19, 2018).

EP Application 18210556.9; not yet published; 30 pages (Dec. 5, 2018).

\* cited by examiner

AUTHENTICATION TOKEN AND METHOD OF OPERATING THE SAME

CROSS-REFERENCE TO RELATED APPLICATIONS

This application claims the priority under 35 U.S.C. § 119 of European patent application no. 18181228.0, filed Jul. 2, 2018, the contents of which are incorporated by reference herein.

OVERVIEW

The present disclosure relates to an authentication token. Furthermore, the present disclosure relates to a method of operating an authentication token, and to a corresponding computer program.

Authentication tokens are widely used for executing a variety of transactions, for example payment transactions. Examples of such authentication tokens are wearable devices, internet-of-things (IoT) devices and smart cards, by means of which a user can authenticate himself to a specific device or service. Authentication tokens are often equipped with so-called secure elements. A secure element may for example be an embedded chip, more specifically a tamper-resistant integrated circuit with installed or pre-installed smart-card-grade applications, for instance payment applications, which have a prescribed functionality and a pre-scribed level of security. Furthermore, a secure element may implement security functions, such as cryptographic functions and authentication functions.

For a convenient application, authentication tokens of the kind set forth are often equipped with a contactless communication unit (e.g. an ISO/IEC 14443 interface). To increase the security of transactions, payment network providers often demand biometric authentication. Biometric authentication requires additional power for the capturing of biometric samples and the processing of captured samples. It is noted that contactless communication adds further power restrictions to the system, especially if energy is provided by low-capacitance energy storage elements and by inductive or capacitive coupling. Critical power conditions may occur in case of low charging levels of energy storage elements, which may lead to increased source impedances, causing voltage drops that are higher than expected in case of an increased power demand. Similar conditions may occur in case of inductive or capacitive coupling, if the field strength of the supplying field becomes too weak or the magnetic coupling becomes too small. In this scenario, power shortages or power interruptions may result in transaction failures. Furthermore, biometric authentication requires additional time for capturing and processing the biometric samples, which may exceed the time slot within which a payment network expects an authentic response by the token. For security reasons, a session established by a cryptographic method may be ceased in case the communication is not maintained by the token for a certain amount of time, which may be indicative for an intrusion attempt to the session communication.

Thus, it may be desirable to improve authentication tokens of the kind set forth, more specifically to reduce the risk of transaction failures caused by one or more of the above-mentioned factors.

SUMMARY

In accordance with a first aspect of the present disclosure, an authentication token is provided, comprising: a communication unit for contactless communication between the token and an external device; an energy storage unit for storing energy; a biometric capturing unit for capturing at least one biometric sample; a processing unit for processing the biometric sample captured by the biometric capturing unit; wherein the token further comprises a synchronization unit configured to: determine a communication status of the communication unit; determine a power supply capability of the energy storage unit; adjust a processing speed of the processing unit in dependence on said communication status and said power supply capability.

In an embodiment, the synchronization unit is further configured to adjust an operating speed of the biometric capture unit in dependence on said communication status and said power supply capability.

In an embodiment, the synchronization unit is further configured to halt the processing by the processing unit if the communication status indicates that no communication takes place or that the communication is unstable.

In an embodiment, halting the processing by the processing unit causes an overflow of a buffer of the biometric capturing unit, such that the operation by the biometric capturing unit is halted.

In an embodiment, the synchronization unit is further configured to reduce the processing speed of the processing unit if the power supply capability falls below a predefined, first threshold.

In an embodiment, the synchronization unit is further configured to increase the processing speed of the processing unit if the power supply capability rises above a predefined, second threshold.

In an embodiment, the communication status may be indicative of a wait time extension, WTX, event, and the synchronization unit is further configured to halt the processing by the processing unit if the communication status indicates a WTX event.

In an embodiment, the synchronization unit is a functional unit that is distributed over the processing unit, the biometric capturing unit, and a secure element of the token.

In an embodiment, the secure element is configured to monitor the communication status.

In an embodiment, the secure element is configured to transmit wait time extension, WTX, messages to an external host.

In an embodiment, the communication status is indicative of a power dropout condition.

In an embodiment, the processing unit is a microcontroller.

In an embodiment, the token is a wearable device, an internet-of-things device, or a smart card.

In accordance with a second aspect of the present disclosure, a method of operating an authentication token is conceived, said token comprising: a communication unit for contactless communication between the token and an external device; an energy storage unit for storing energy; a biometric capturing unit for capturing at least one biometric sample; a processing unit for processing the biometric sample captured by the biometric capturing unit; a synchronization unit; wherein the synchronization unit determines a communication status of the communication unit, determines a power supply capability of the energy storage unit, and adjusts a processing speed of the processing unit in dependence on said communication status and said power supply capability.

In accordance with a third aspect of the present disclosure, a computer program is provided, comprising executable instructions that, when executed, carry out or control a method of the kind set forth.

DESCRIPTION OF DRAWINGS

Embodiments will be described in more detail with reference to the appended drawings, in which.

DESCRIPTION OF EMBODIMENTS

Figure 1A:
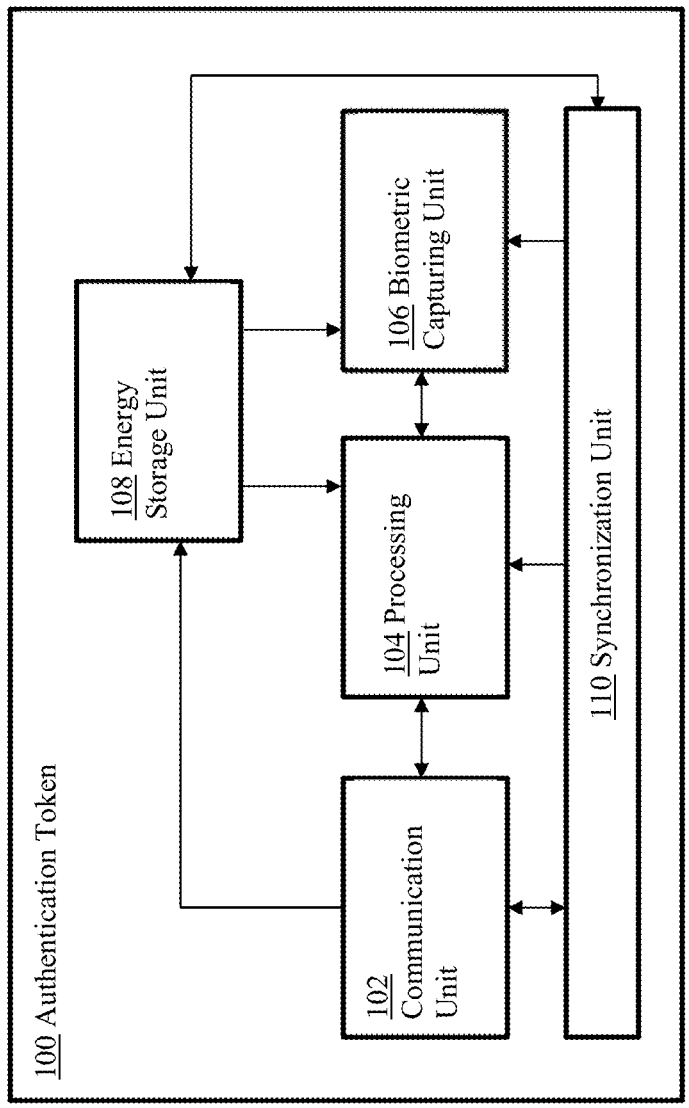
FIG. 1A shows an illustrative embodiment of an authentication token.

FIG. 1A shows an illustrative embodiment of an authentication token 100. The authentication token 100 comprises a communication unit 102, a processing unit 104, a biometric capturing unit 106, an energy storage unit 108, and a synchronization unit 110. It is noted that, although the synchronization unit 110 is shown as a separate unit, the synchronization unit 110 may also be implemented as a functional unit whose functionality is distributed over other components, such as the communication unit 102, the processing unit 104, and the biometric capturing unit 106. This is described in more detail with reference to FIG. 1C.

In accordance with the present disclosure, the communication unit 102 is configured to enable contactless communication between the token 100 and an external device (not shown). For instance, if the communication unit 102 is an ISO/IEC 14443 communication interface, and the authentication token 100 is a smart card, then the external device may be a corresponding reader embedded in a payment terminal. Furthermore, the biometric capturing unit 106 is configured to capture at least one biometric sample. For instance, the biometric capturing unit 106 may be a fingerprint capturing unit with an integrated fingerprint sensor. In that case, the biometric sample may be a fingerprint image. Furthermore, the processing unit 104 is configured to process the biometric sample captured by the biometric capturing unit 106. For instance, if the biometric sample is a fingerprint image, then the processing unit 104 may be configured to extract relevant fingerprint features from said image, and to generate a corresponding fingerprint template. This fingerprint template can subsequently be compared, for example by a secure element, with a reference fingerprint template. In addition, the synchronization unit 110 is configured to determine a communication status of the communication unit 102, to determine a power supply capability of the energy storage unit 108, and to adjust a processing speed of the processing unit 104 in dependence on said communication status and said power supply capability. In this way, the likelihood of errors in processing the biometric sample may be reduced. More specifically, processing errors caused by power shortages or power interruptions—occurring for instance when a contactless communication session is interrupted—can be avoided. In a practical and effective implementation, the processing unit 104 is a microcontroller.

Figure 1B:
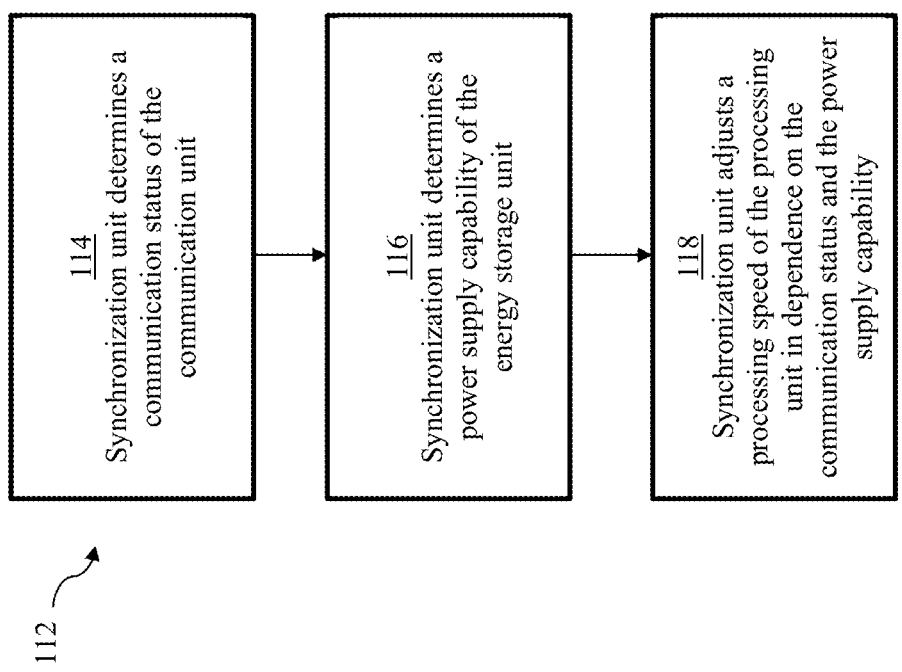
FIG. 1B shows an illustrative embodiment of a method of operating an authentication token.

FIG. 1B shows an illustrative embodiment of a method 112 of operating an authentication token of the kind set forth. The method 112 comprises the following steps: at 114, the synchronization unit determines a communication status of the communication unit, at 116, the synchronization unit determines a power supply capability of the energy storage unit, and at 118, the synchronization unit adjusts a processing speed of the processing unit in dependence on the communication status and the power supply capability. As mentioned above, in this way, the likelihood of errors in processing the biometric sample may be reduced. In a practical and effective implementation, the steps of the method 112 may at least partially be controlled or carried out by a computer program.

In an embodiment, the synchronization unit is further configured to adjust an operating speed of the biometric capture unit in dependence on said communication status and said power supply capability. In this way, the likelihood of errors in capturing the biometric sample may be reduced. More specifically, operating errors of the biometric capturing unit caused by power shortages or power interruptions—occurring for instance when a contactless communication session is interrupted—can be avoided. In an embodiment, the synchronization unit is further configured to halt the processing by the processing unit if the communication status indicates that no communication takes place or that the communication is unstable. In this way, the likelihood of errors in processing the biometric sample may be further reduced. More specifically, halting the processing by the processing unit makes sure that the processing unit cannot malfunction during a power shortage event, for example. Furthermore, in an embodiment, halting the processing by the processing unit causes an overflow of a buffer of the biometric capturing unit, such that the operation by the biometric capturing unit is halted. In this way, the likelihood of errors in capturing and processing the biometric sample may be further reduced. In an embodiment, the synchronization unit is further configured to reduce the processing speed of the processing unit if the power supply capability falls below a predefined, first threshold. In this way, a minimum operating condition can be defined, allowing the processing unit to operate without limitations if said minimum operation condition is met. In an embodiment, the synchronization unit is further configured to increase the processing speed of the processing unit if the power supply capability rises above a predefined, second threshold. In this way, the performance of the token can be improved if the power conditions are favorable. In an embodiment, the communication status is indicative of a power dropout condition. In this way, the effect of a power dropout on a biometric authentication process performed by an authentication token of the kind set forth is mitigated.

Figure 1C:
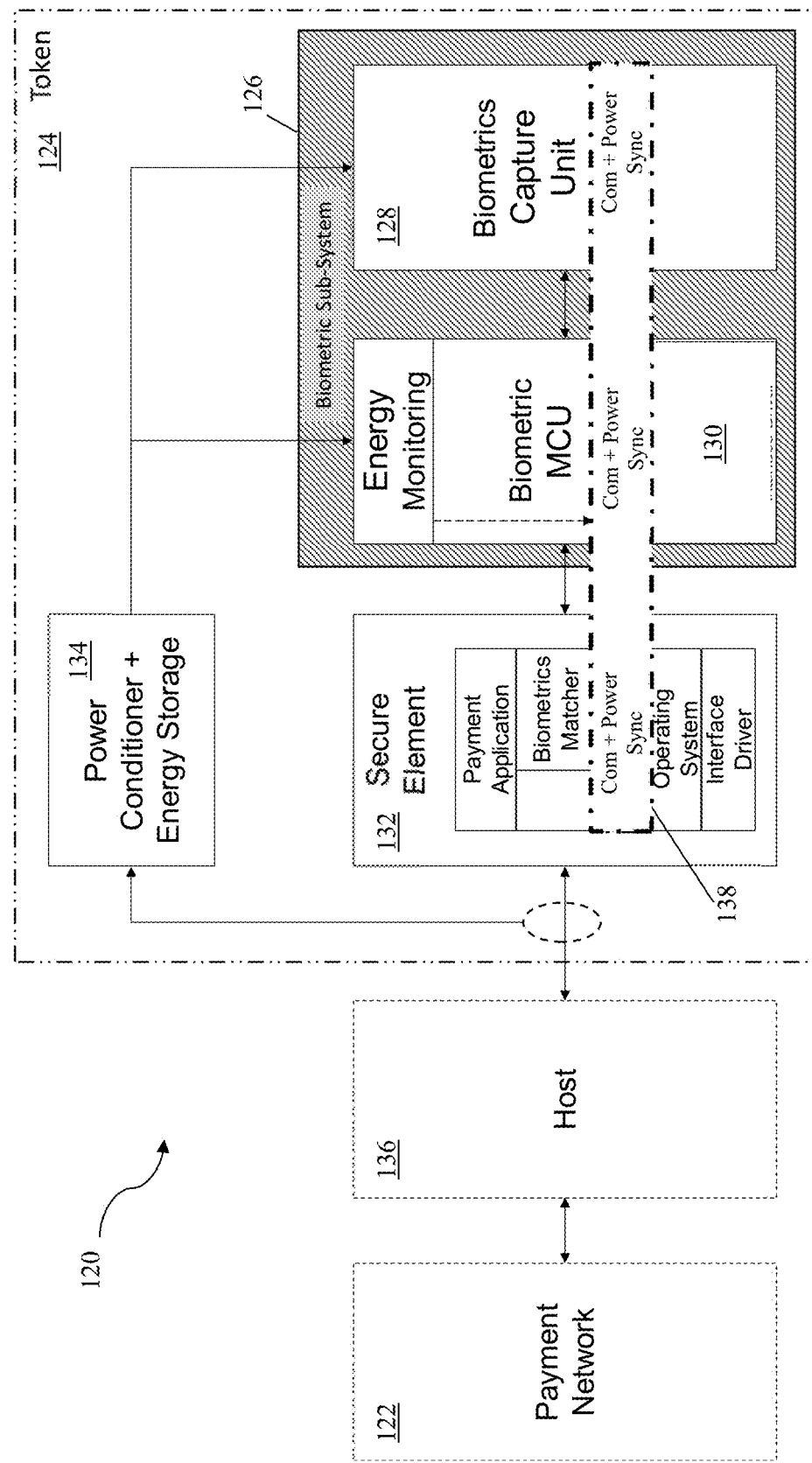
FIG. 1C shows an illustrative embodiment of an authentication system.

FIG. 1C shows an illustrative embodiment of an authentication system 120. The system 120 comprises a payment network 112, a token 124, and a host 136. The token 124 comprises a biometric sub-system 126, a secure element 132, and a power conditioner and energy storage unit 134. The biometric sub-system 126 comprises a biometric capturing unit 128 and a biometric processing unit 130 (i.e., a microcontroller). Furthermore, the token 124 comprises a synchronization unit of the kind set forth, referred to as a communication and power synchronization unit 138 in this example. In operation, the communication and power synchronization unit 138 may adapt the token's operation to the communication status and power condition. In this practical and effective implementation, the communication and power synchronization unit 138 is a functional unit distributed over the secure element 132, the biometric processing unit 130, and the biometric capturing unit 128. In this example, the secure element 132 may be configured to monitor the communication status. In this way, no additional monitoring unit is needed.

The secure element 132 may contain a secure microcontroller that is configured to execute code having the following functionality: an interface driver, an operating system or an operation scheduler, a biometric matching component, and a payment application. Similarly, the biometric processing unit 130 may be a microcontroller that is configured to execute code having the following functionality: an interface driver, an operating system or an operation scheduler, an application that receives biometric samples through an interface with the biometric capturing unit 128. The biometric capturing unit 128 may be configured to translate biometric samples into a machine-readable representation of contrast elements. Furthermore, the power conditioner and energy storage unit 134 may harvest energy from a contactless communication interface (e.g., a payment network interface or a power interface) to condition it for subsequent use. The energy storage unit may contain a capacitor for storing energy.

Figure 2:
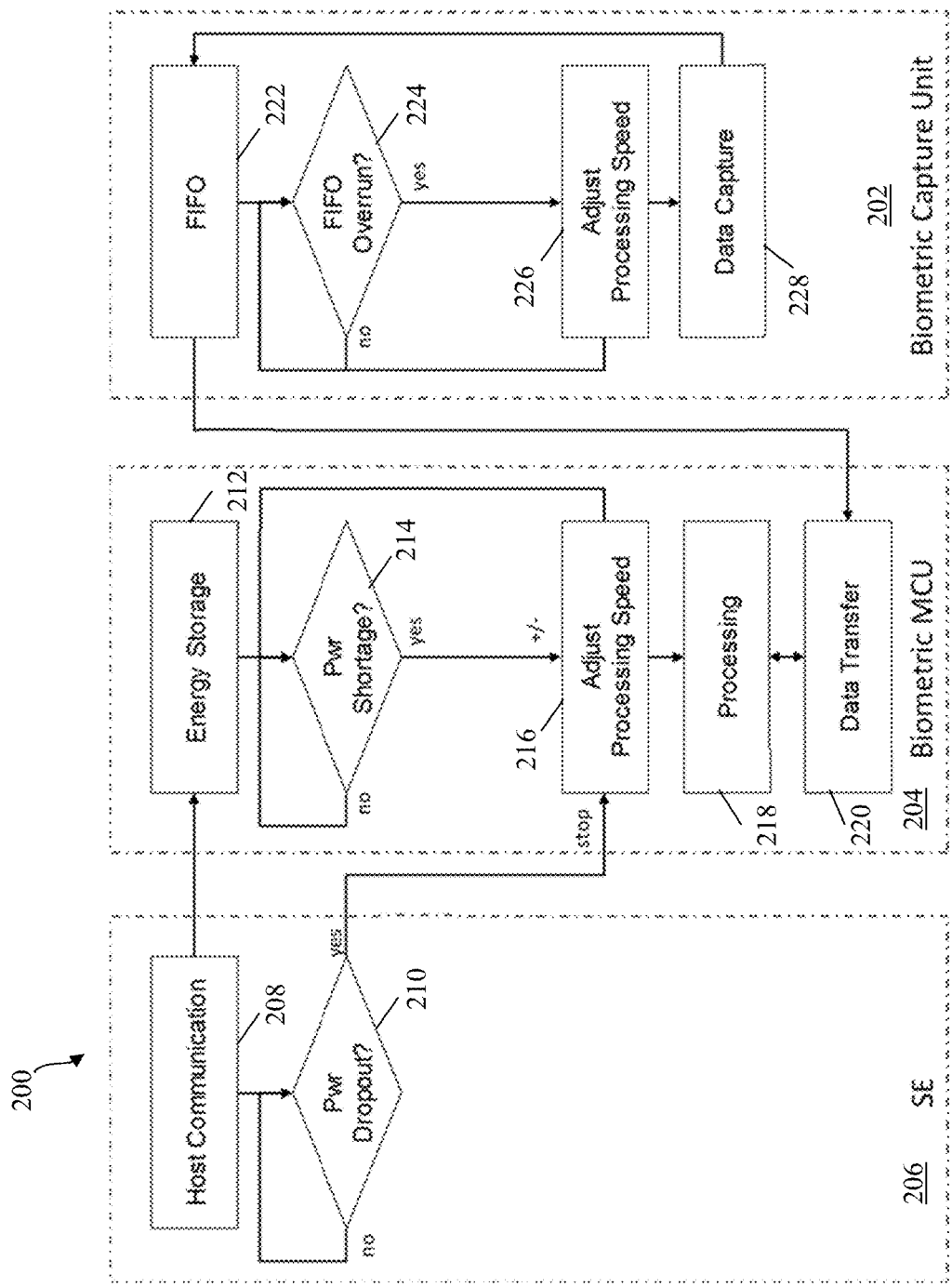
FIG. 2 shows an illustrative embodiment of an operation of a synchronization unit.

FIG. 2 shows an illustrative embodiment of an operation 200 of a synchronization unit. The synchronization unit may be a functional unit that may be physically spread over the secure element, biometric MCU and biometric capturing unit. In operation, the synchronization unit may evaluate the actual communication status and the actual power supply capability of the energy storage element and may in response 1) adjust the processing speed of the biometric MCU and 2) may indirectly adjust the operating speed of the biometric capturing unit. An upcoming (expected) power shortage caused by an unstable host communication, for example, may have precedence over an energy storage level indication and may thus stop the processing of the biometric MCU immediately. Unstable communication may refer to an interrupted communication, for example, when the token moves outside the range of an RF field generated by an external reader. Stopping the biometric MCU may result in a buffer (e.g. a first-in-first-out, FIFO, buffer) of the biometric capturing unit that cannot be emptied by reading, thus causing said buffer to overrun. Such overrun, if detected, may slow down the operating speed of the biometrics capturing unit until it may come to a complete stop.

If there is no indication for an upcoming power shortage caused by the host communication, the monitored power supply capability of the energy storage unit may be utilized to adapt the processing speed of the biometric MCU. If the level of the energy stored in the energy storage unit falls below a lower threshold, the processing speed of the biometric MCU may be reduced to lower its energy demand. If the level of the energy stored in the energy storage unit rises above an upper threshold, the processing speed of the biometric MCU may be increased to increase its energy demand. Thus, the processing speed of the biometric MCU may be adapted to the energy made available by the energy storage unit. The communication speed of the interface from the biometric capturing unit to the biometric MCU may follow the processing speed of the biometric MCU. In this case, a change in said communication speed may impact the FIFO-level. The operating speed of the biometric capture unit may be made adaptive to the FIFO-level. Since the FIFO-level may depend on the communication speed of the interface from the biometric capturing unit to the biometric MCU, which may depend on the energy level of the energy storage unit, the operating speed of the biometric capturing unit may be adapted to the energy level of the energy storage unit as well. It may be advantageous that no control information needs to be sent by the biometric MCU to the biometrics capturing unit while e.g. data communication is in progress, and that instead the biometric capturing unit adapts to the data flow between the biometric capturing unit and the biometric MCU. In accordance with the present disclosure, the operation of the biometric MCU and the biometric capturing unit may be adapted to power shortages caused by an unstable host communication and power shortages caused by other mechanisms like drained energy storage or weak energy coupling field. More specifically, the reaction time of the biometric MCU and the biometric capturing unit may be configured such that within a given reaction time the biometric sub-system may react reliably on a power shortage caused by, for instance, an unstable host communication. Such expected upcoming power shortage may be signaled by said given reaction time ahead of its occurrence to safeguard system operation.

Figures 3A, 3B:
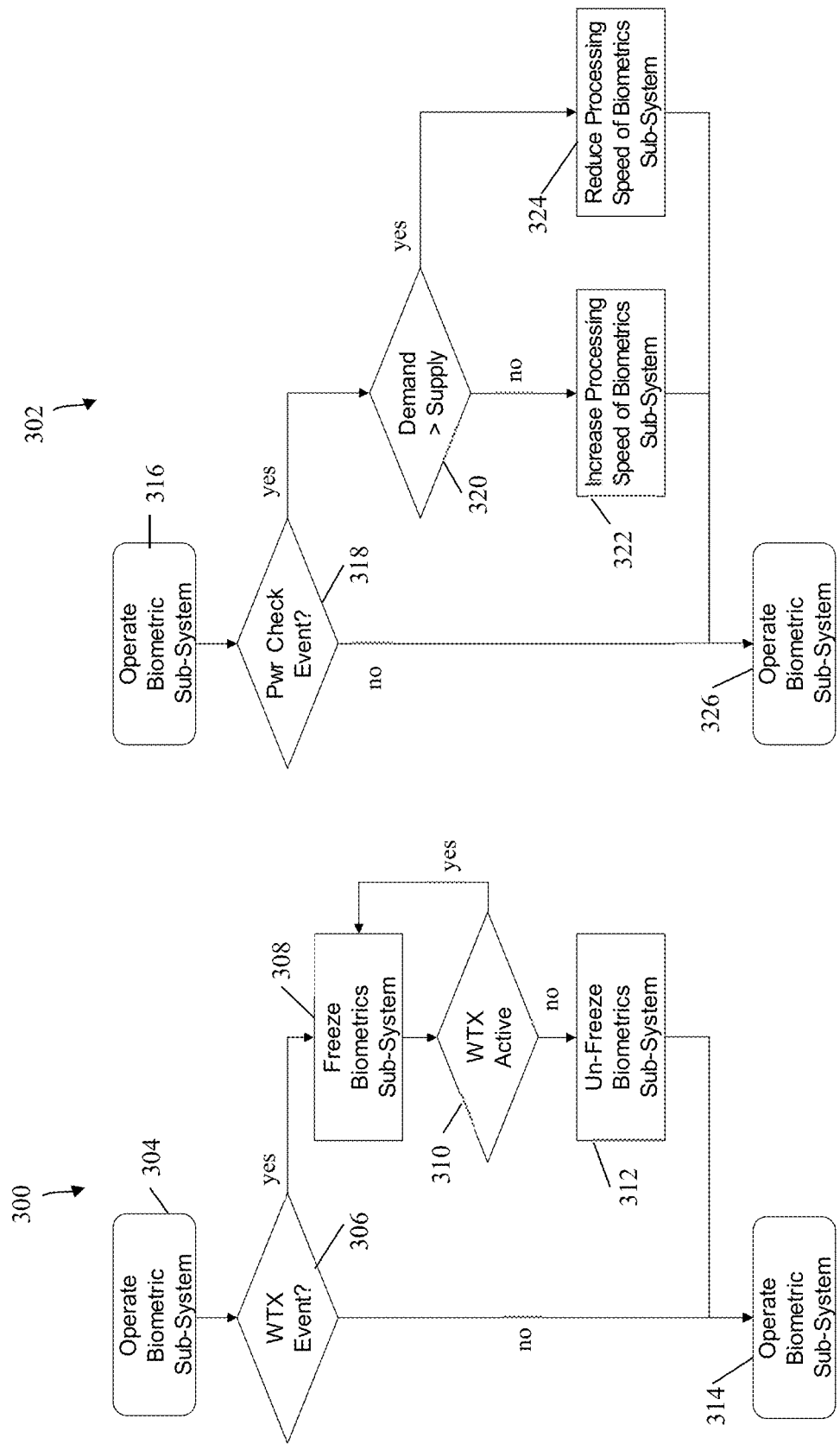
FIGS. 3A and 3B shows illustrative embodiments of operations of a biometric sub-system.

FIGS. 3A and 3B shows illustrative embodiments of operations 300, 302 of a biometric sub-system of the kind set forth. More specifically, it shows basic control modes of the synchronization unit. In a first control mode 300, the biometric sub-system is frozen in response to a wait time extension (WTX) event. The biometric sub-system remains frozen while said WTX event is active. In a second control mode 302, the processing speed of the biometric sub-system is adjusted in response to a power check event. In the power demand is greater than the power supply, then the processing speed is reduced, and otherwise the processing speed is increased.

Figure 4:
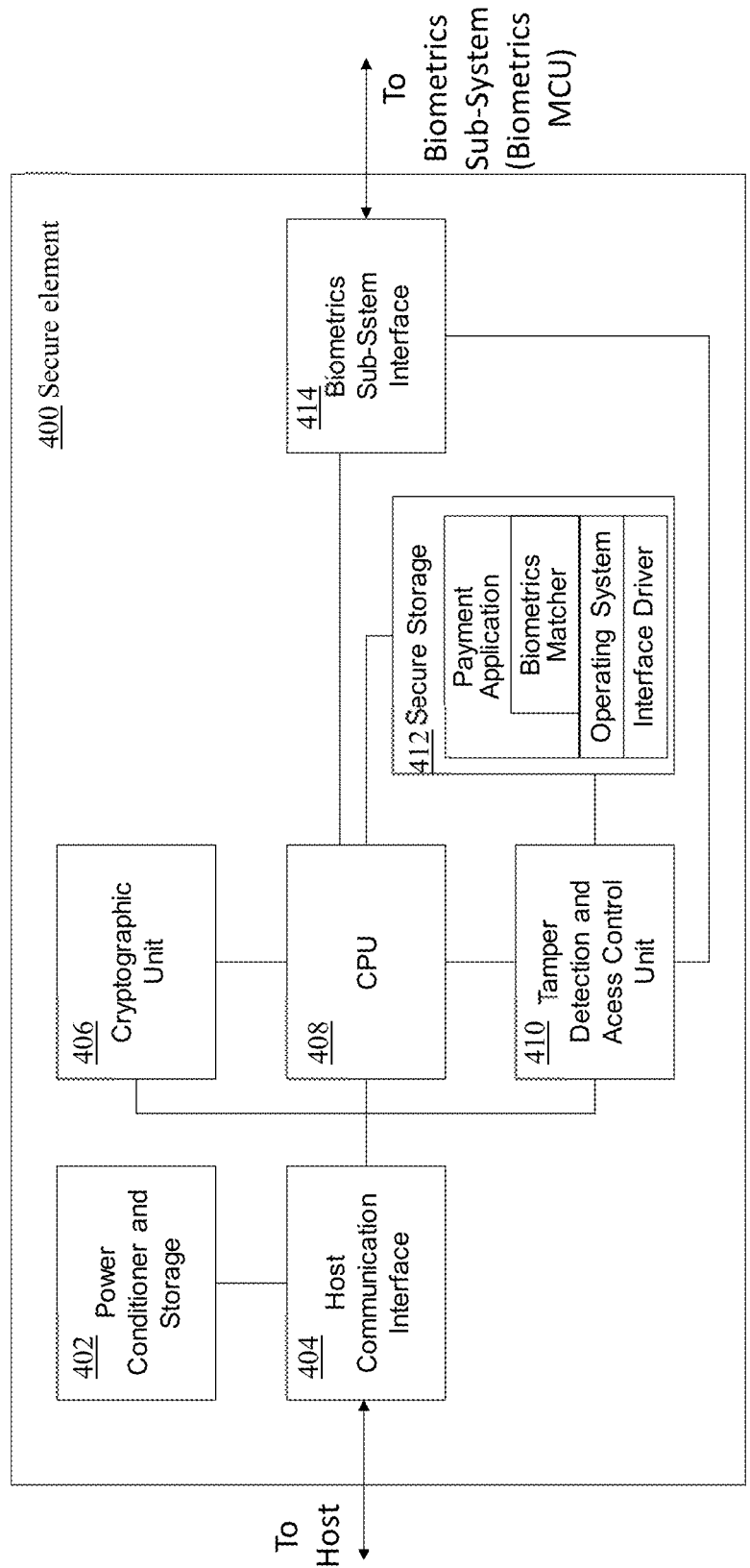
FIG. 4 shows an illustrative embodiment of a secure element.

FIG. 4 shows an illustrative embodiment of a secure element 400. The secure element 400 comprises a power conditioner and energy storage unit 402, a host communication interface 404, a cryptographic unit 406, a central processing unit 408, a tamper detection and access control unit 410, a secure storage unit 412, and a biometric sub-system interface unit 414. The central processing unit 408 and the secure storage unit 408 may form part of a secure microcontroller that is configured to execute code having the following functionality: an interface driver, an operating system or an operation scheduler, a biometric matching component, and a payment application. The secure element 400 shown in FIG. 4 may form part of the token 124 shown in FIG. 1C.

More specifically, the secure element 400 may be certified in accordance with EMV® specifications, as managed by the EMVCo consortium. The secure element 400 may be operatively coupled to a host via a contactless communication channel. The host may in turn be operatively coupled to a payment network. The host may for example be a Point-of-Sales (POS) terminal that requests the token to process and authenticate a financial transaction by means of biometric authentication. The secure element 400 may comprise a CPU 408, secure storage 412 that may comprise secure read-only memory (ROM) and random-access memory (RAM), a cryptographic unit 406, a host communication interface 404, a biometric sub-system interface 414, and a tamper detection and access control unit 414 operatively coupled to the CPU 408, secure storage 412, cryptographic unit 406 and biometric sub-system interface 414 with the purpose of preventing unauthorized operations. In operation, the secure element 400 may execute code that is stored in the secure storage unit 412, for example a payment application with an embedded biometric authentication function.

As soon as the token 400 is coupled to the host, it may harvest energy through the coupling, condition the stored energy and provide the conditioned energy to the biometric MCU and biometrics capture unit (i.e., to the biometric sub-system) through the biometric sub-system interface 414. Thus, the secure element 400, biometric MCU and biometric capturing unit may be set into an operational mode and may subsequently be operationally initialized. Following the initialization, the biometric MCU and the biometric capturing unit may be set into a sleep mode, where the term "sleep mode" may refer to any operational mode wherein the component consumes a minimal amount of power but may still be able to receive and decode commands that may bring said component back into a normal operational mode.

Figure 5:
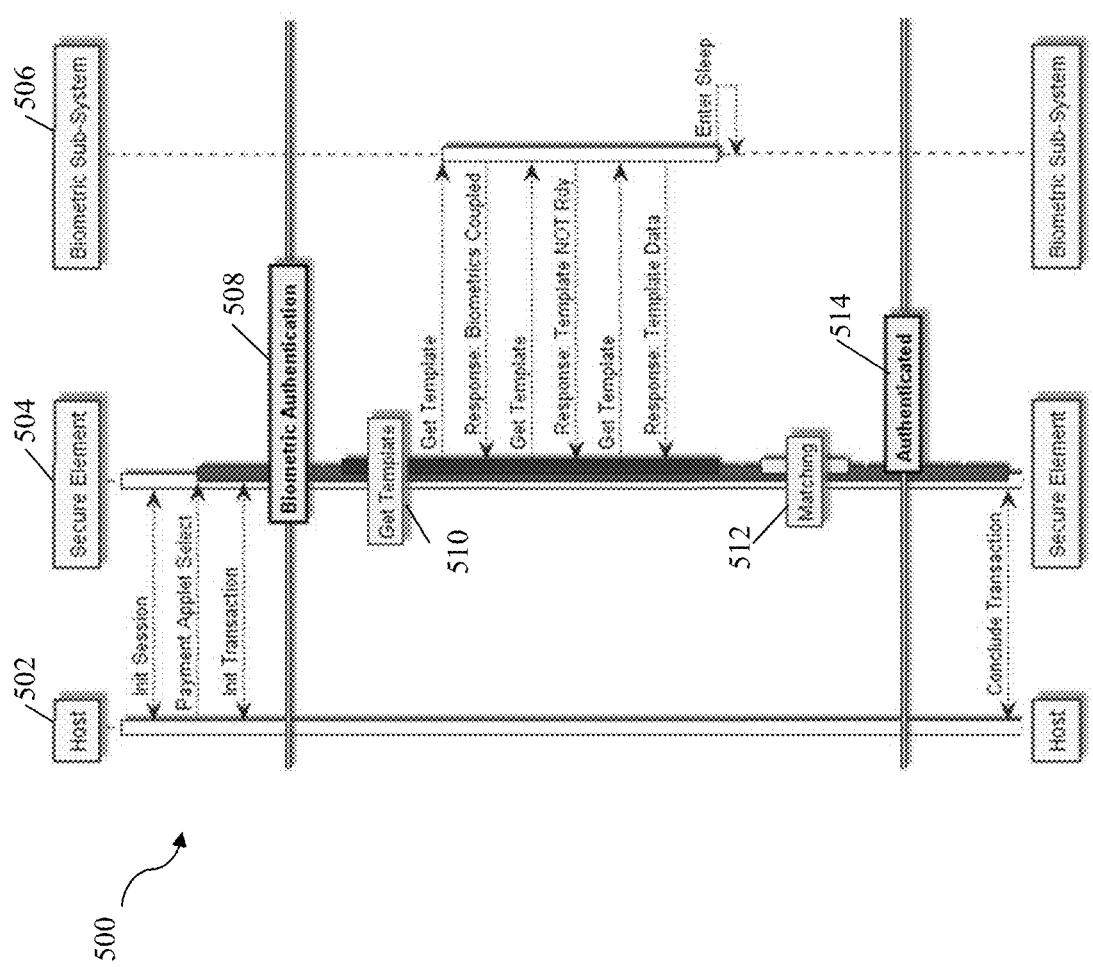
FIG. 5 shows an illustrative embodiment of a biometric authentication sequence.

FIG. 5 shows an illustrative embodiment of a biometric authentication sequence 500. In a normal application mode, the host may communicate with the secure element (SE) with the purpose of selecting a payment application for execution by the SE. The term "payment application" may refer to any kind of application requesting authentication. In a certain processing step executed by said payment application, biometric authentication may be requested to verify a card holder's claim of identity. For authentication, the payment application may specifically request a biometric template ("Get Template"). The term "template" may refer to a collection of biometric features organized in a processable data structure and representing an individual's identity. Such a template may be generated from a machine-readable representation of a biometric sample by performing processing operations on said machine-readable representation with the purpose of providing a machine-readable set of biometric features. The process of generating said template is referred to as "Feature Extraction" herein. The generation of the template is performed by the biometric MCU. The extracted features may be compiled into a data structure called template.

The "Get Template" request may be communicated to the biometric sub-system, more specifically to the biometric MCU. The "Get Template" request may trigger the biometric MCU to exit the sleep mode and start a processing sequence with the purpose of generating a template. As a first operational step, the biometric MCU may request an image ("Get Image") from the biometrics capturing unit. Note that the term "image" may refer to any machine-readable representation of an individual's biometric sample. Upon reception of the image request, the biometric capturing unit may be configured to exit the sleep mode and enter a normal operational mode. Capturing the image may be made dependent of coupling of an external object, such as a finger, to a sensor of the biometric capturing unit. The biometric capturing unit may collect measurement results of a plurality of sensor cells, for example, and create an image using said results. This image may subsequently be transmitted to the biometric MCU.

Figure 6:
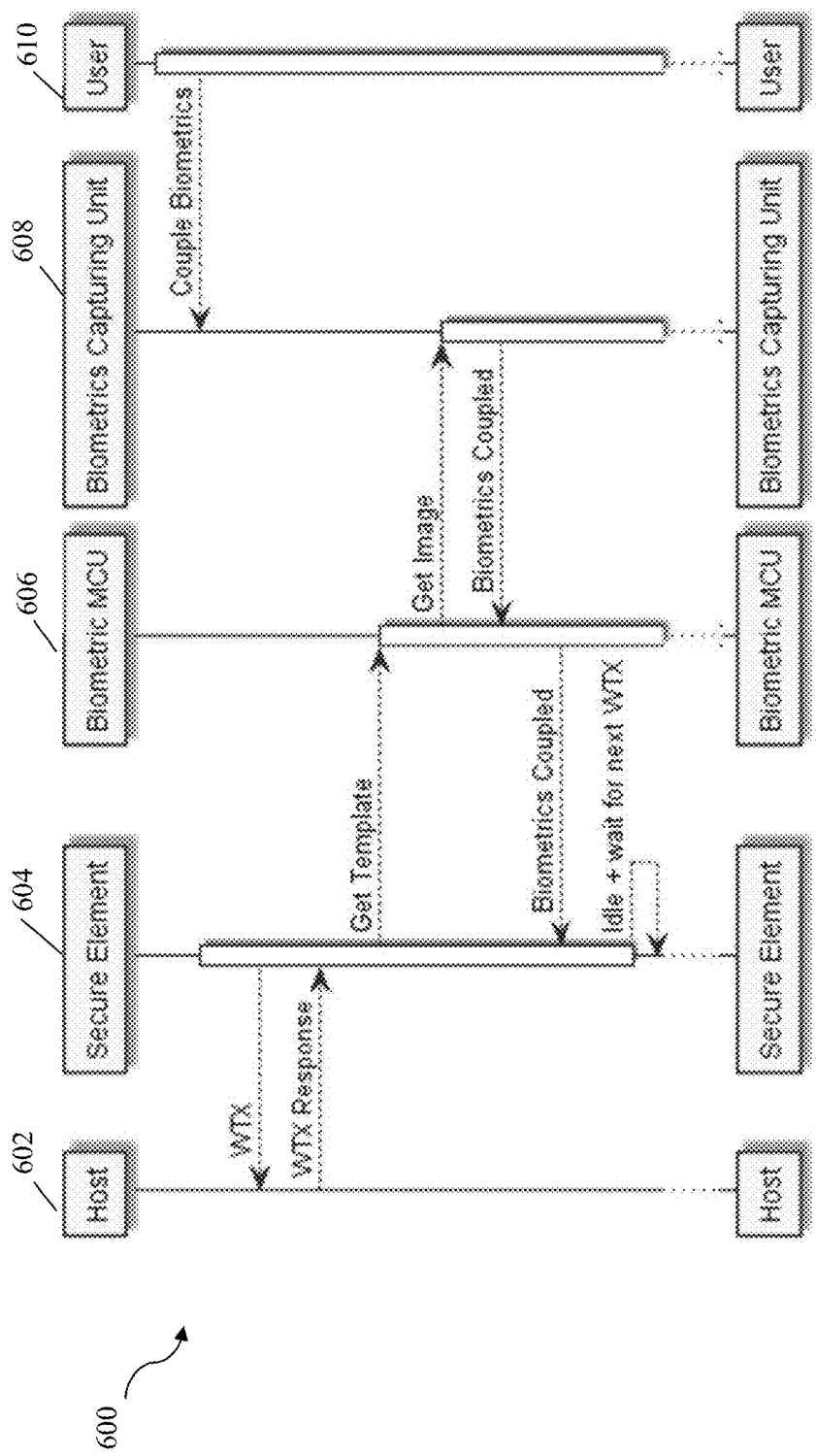
FIG. 6 shows an illustrative embodiment of a biometric coupling positive sequence.

FIG. 6 shows an illustrative embodiment of a biometric coupling positive sequence 600. In particular, if biometric coupling has been detected—for example, it a finger touches a sensor of the biometric capturing unit—then the biometric capturing unit may return a related message ("Biometrics Coupled") to the biometric MCU, which may further return a related message ("Biometrics Coupled") to the SE with the purpose of displaying the same on a remote display unit, for example. Furthermore, the biometric capturing unit may translate the individual's biometric sample into a machine-readable format and transmit the machine-readable biometric data to the biometric MCU. Note that the term "Image Capture" may thus also refer to the process of translating the individual's biometrics into machine-readable format.

Figure 7:
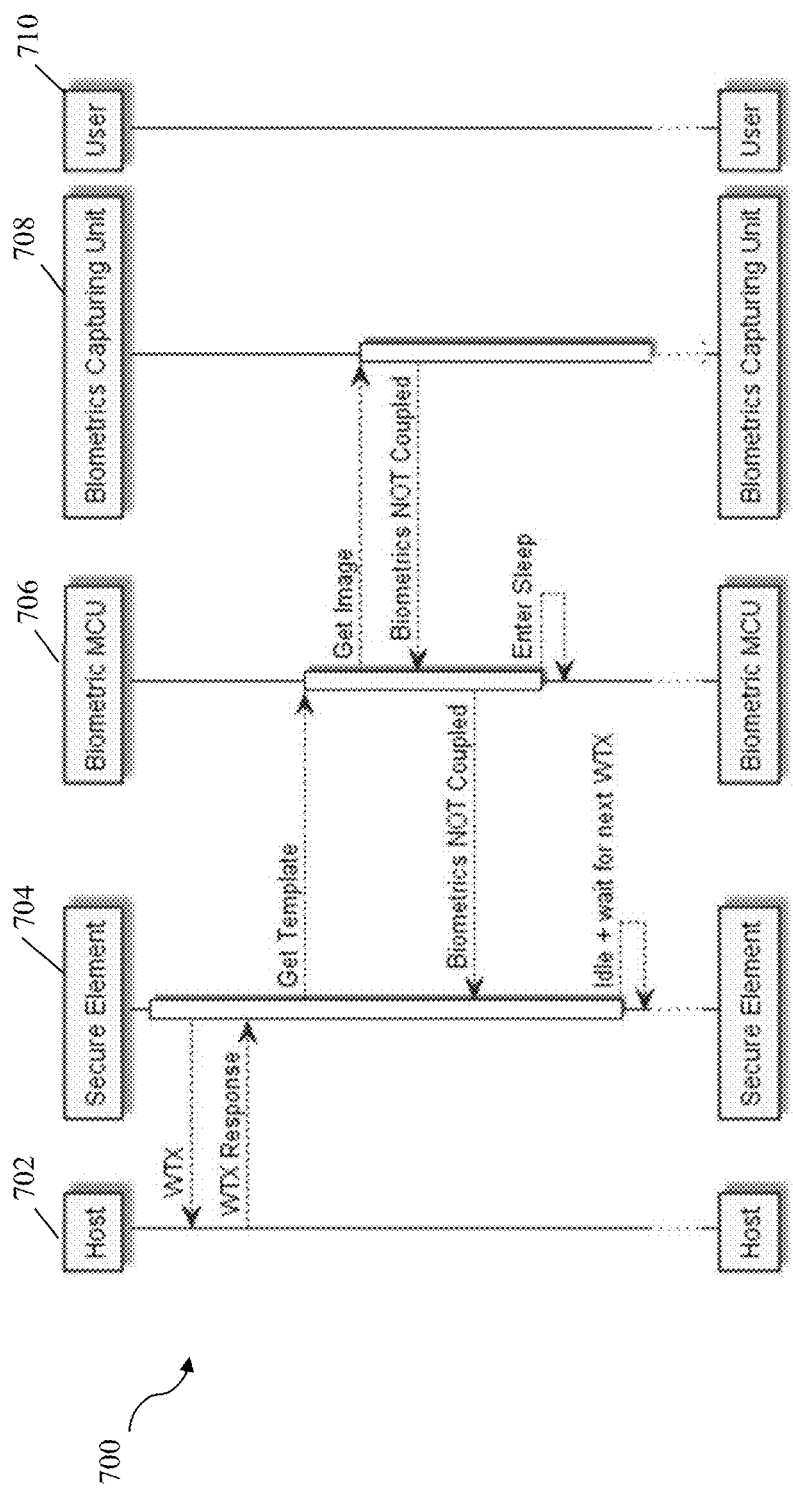
FIG. 7 shows an illustrative embodiment of a biometric coupling negative sequence.

FIG. 7 shows an illustrative embodiment of a biometric coupling negative sequence 700. In particular, if no biometric coupling is detected, then the biometric capturing unit may return information indicating a missing coupling ("Biometrics Not Coupled"). In response, the biometric MCU may return information to the SE that coupling is not present.

Figure 9:
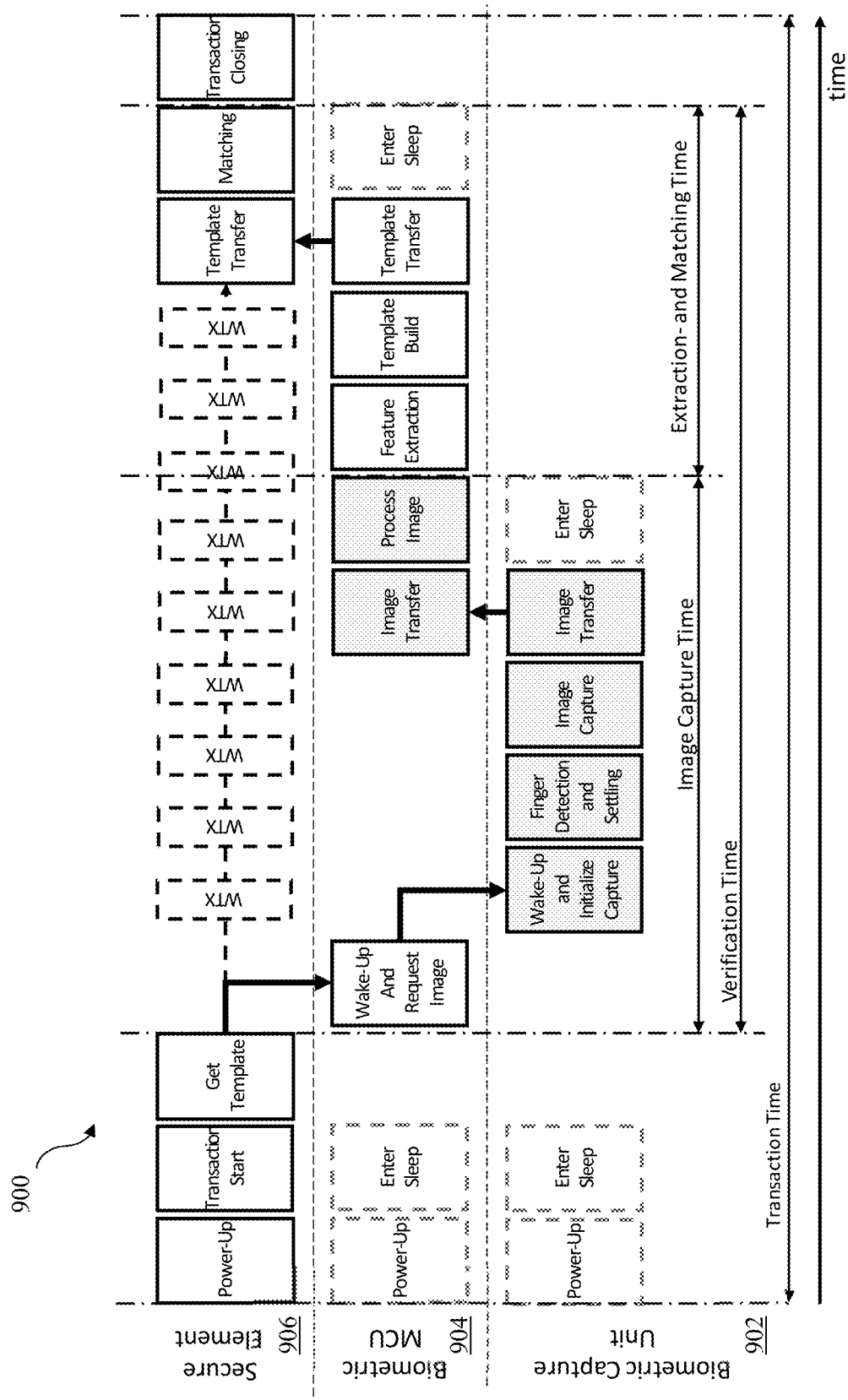
FIG. 9 shows an illustrative embodiment of an authenticated transaction.

In case of coupling, and if said image has been transferred to the biometric MCU, the biometric capturing unit may re-enter the sleep mode, while the biometric MCU may apply the processing steps "Process Image", "Feature Extraction" and "Template Build" as shown in FIG. 9. Note that "Process Image" may comprise processing steps like filtering, re-sampling, contrast improvement to prepare the image for optimal processing in the step "Feature Extraction". The step "Feature Extraction" may comprise processing steps to extract biometric features like minutiae, heartbeat characteristics, face geometry characteristics from the image. Furthermore, "Template Build" may comprise processing steps to organize the extracted features in a data structure comprising a collection of machine-readable biometric features.

Since the SE may also be operatively coupled to the host, the SE may request the host to keep the communication line between the SE and the host alive while the SE, supported by the biometric MCU, may be handling the process of authentication. For this purpose, the SE may periodically send short Wait Time Extension (WTX) data packets to the host to make sure that the host is informed to keep the communication line alive. In this way, the authentication process can be carried out with a minimal risk of failures caused by interrupted communication sessions. WTX may refer to any type of "Keep-Alive" indication as defined by the communication protocol utilized for communication between the SE and the host. For instance, in case the communication protocol is ISO/IEC 14443, the Keep-Alive data packet may be a WTX data packet.

For security reasons, the SE may only be configured as communication master when communicating with the biometric MCU. For receiving the template created by the biometric MCU, the SE may periodically poll the biometric MCU for template availability. More specifically, the SE may be polling the biometric MCU periodically in a timing grid, in particular in the WTX timing grid or in a timing grid that is synchronized with the WTX timing grid. The term "polling" may refer to sending a code sequence to a device that, when processed by said device, causes a data packet to be returned that may be indicative of a processing status of said device. A timing grid with reference to the WTX timing may be utilized as the SE may periodically send WTX packets to the host and sending these WTX packets may coincide with a power shortage. This is because sending a WTX data packet may stimulate the host to return a verification response. During the time interval of (1) the SE sending a WTX data packet, (2) the host processing the WTX data packet, and (3) the host returning a verification response, the communication interface operation may have a significant impact on the available power. This may be due to power consumed by the SE's transmitter, or in case the communication protocol is ISO/IEC 14443 to additional power consumption by damping the electromagnetic field utilized for communication. In case of the ISO/IEC 14443 protocol, the ASK modulation applied by the host to communicate the WTX verification response may momentarily reduce power provided to the power conditioner and energy storage unit. At this point in time, a power shortage may occur with high probability, which may result in the biometric MCU and/or biometric capturing unit entering a brown-out condition.

Figure 8:
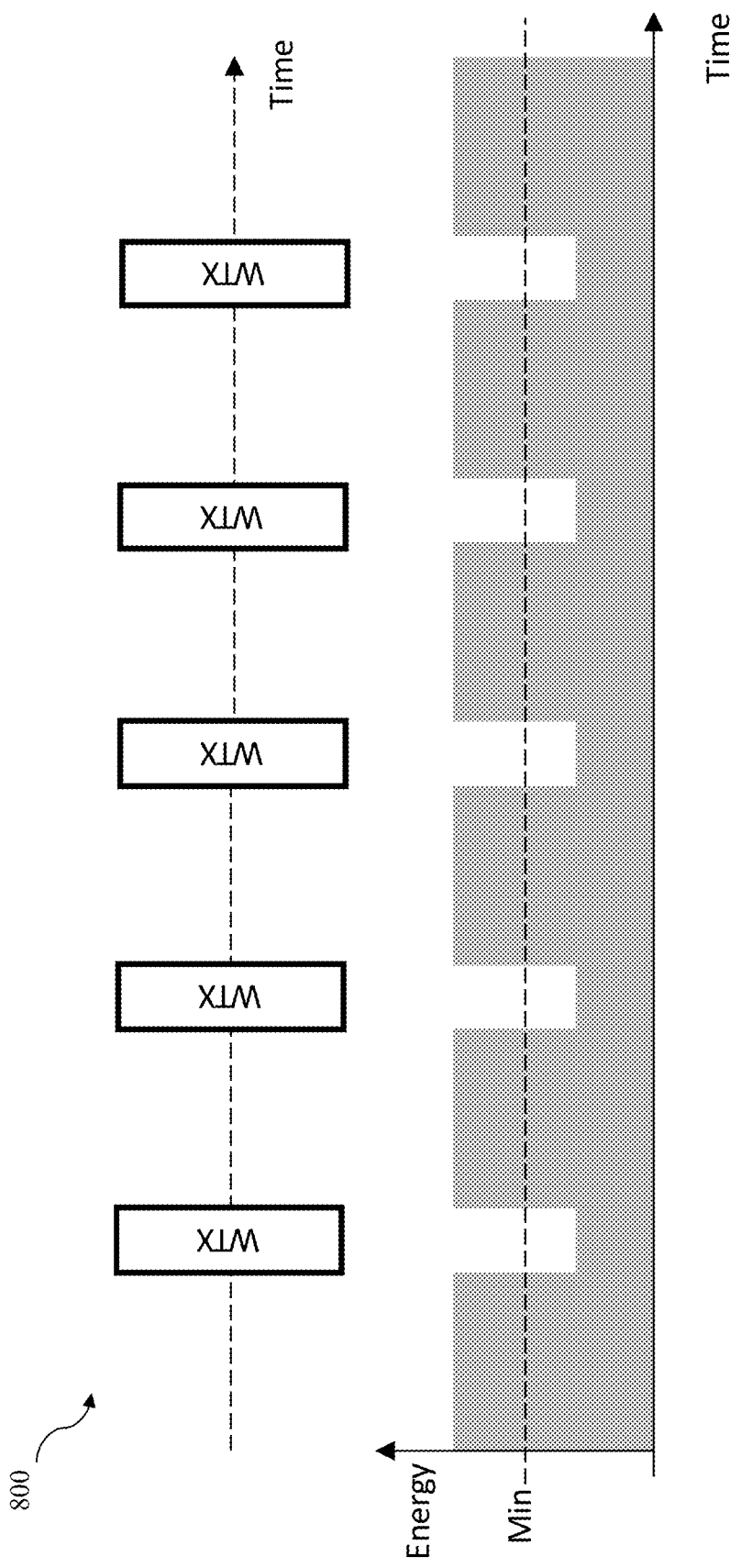
FIG. 8 shows an example of a power shortage during communication.

FIG. 8 shows an example of a power shortage during communication 800. The term "brown-out condition" refers to an undefined power state, where the normal operation of a device cannot be guaranteed, and therefore, operational processing may cause data errors. To avoid such brownout conditions, the following procedure may be implemented:

1. The SE configures itself to periodically generate WTX time events.

2. In case that such a WTX time event indicates an upcoming WTX transmission, the SE may notify the biometric MCU by a suitable command sequence about the upcoming WTX transmission, which may mean an upcoming power shortage. In case the biometric capturing unit is occupied with capturing an image, the biometric MCU may stop reading data from the biometric capturing unit, thus indirectly notifying the biometric capturing unit about an upcoming WTX transmission, in which case the biometric capture unit may enter a clock-stop state. The term "clock-stop" may refer to freezing the biometric capturing unit at the next feasible operational processing step, for example at the end of sampling a contrast element of an image and, in case of an ongoing data transfer between the biometric capturing unit and the biometric MCU, freezing the communication unit at the next feasible operational processing step, for example when a logical data unit (e.g. a byte) has been transferred. In the clock-stop state the biometric capturing unit enters a state of minimal power consumption while still being able to identify continuation of read operations by the biometric MCU, which may affect a FIFO-level and may thus be indicative for leaving the clock-stop state and continue with operation processing exactly at the logical processing step where the clock-stop state was received. Following that indirect notification of the biometric capturing unit about the upcoming WTX transmission, the biometric MCU may enter sleep mode.

3. The SE may communicate a WTX data packet to the host.

4. The host may process the WTX data packet and may return a responding data packet to the SE.

5. Immediately after the responding data package has been received from the host, which may indicate the end of a power shortage interval, the SE may request the biometric MCU to provide the template (template request), which in this case may also indicate the end of the WTX interval.

6. Upon reception of said template request, the biometric MCU may firstly leave the sleep mode, secondly enter a normal operational mode and thirdly check if the template generation has already been concluded. If the template generation has been concluded, the biometric MCU may return the template to the SE, and if the template generation has not been concluded, the biometric MCU may return a response indicating that the template is not ready.

7. If the biometric capturing unit has not concluded the image capturing and image transfer processes, the biometric MCU may continue reading data from the biometric capturing unit to indicate indirectly that the WTX interval has ended. Consequently, the biometric capturing unit may leave its clock-stop state and continue its operation where it was interrupted by the FIFO-overrun condition.

The procedure as described above may ensure that during a WTX interval, i.e. the time interval between sending the WTX data packet and receiving the response on the WTX data packet, the biometric MCU is in sleep mode and that the biometric capturing unit is (1) operationally frozen at a processing step and (2) consuming almost no power in the clock-stop mode.

FIG. 9 shows an illustrative embodiment of an authenticated transaction 900. Once the template has been returned to the SE, the payment application may stimulate a matching process to match the returned template against a template securely stored within the SE. Matching refers to a process step in which a first template is compared with a second template with the purpose of measuring the similarity between the first template and the second template. A person may be positively authenticated if a second template, which has been created using a captured biometric sample, is sufficiently similar to a first template (i.e., a reference template) securely stored within the SE and originating from a biometric sample captured at a previous point in time from the same person. In case of a positive match, the financial transaction may be authenticated and a subsequent "Transaction Closing" processing step and security mechanisms like a retry-counter may be updated and concluded by suitable communication with the payment network that is operationally connected to the host. In case of negative match, information indicating the same is provided to the host. In that case, the host may e.g. give visual feedback to the card holder, and furthermore, security mechanisms like a retry-counter may be updated to reflect the unsuccessful authentication attempt. Such a retry-counter may block the card if a predefined number of unsuccessful authentication attempts in a series has been reached or exceeded without a successful authentication in between; a successful authentication may reset the retry counter. Blocking in this case may mean that the card may not be used to execute financial transactions, but may still communicate with a host to inform about its blocked state.

Figure 10:
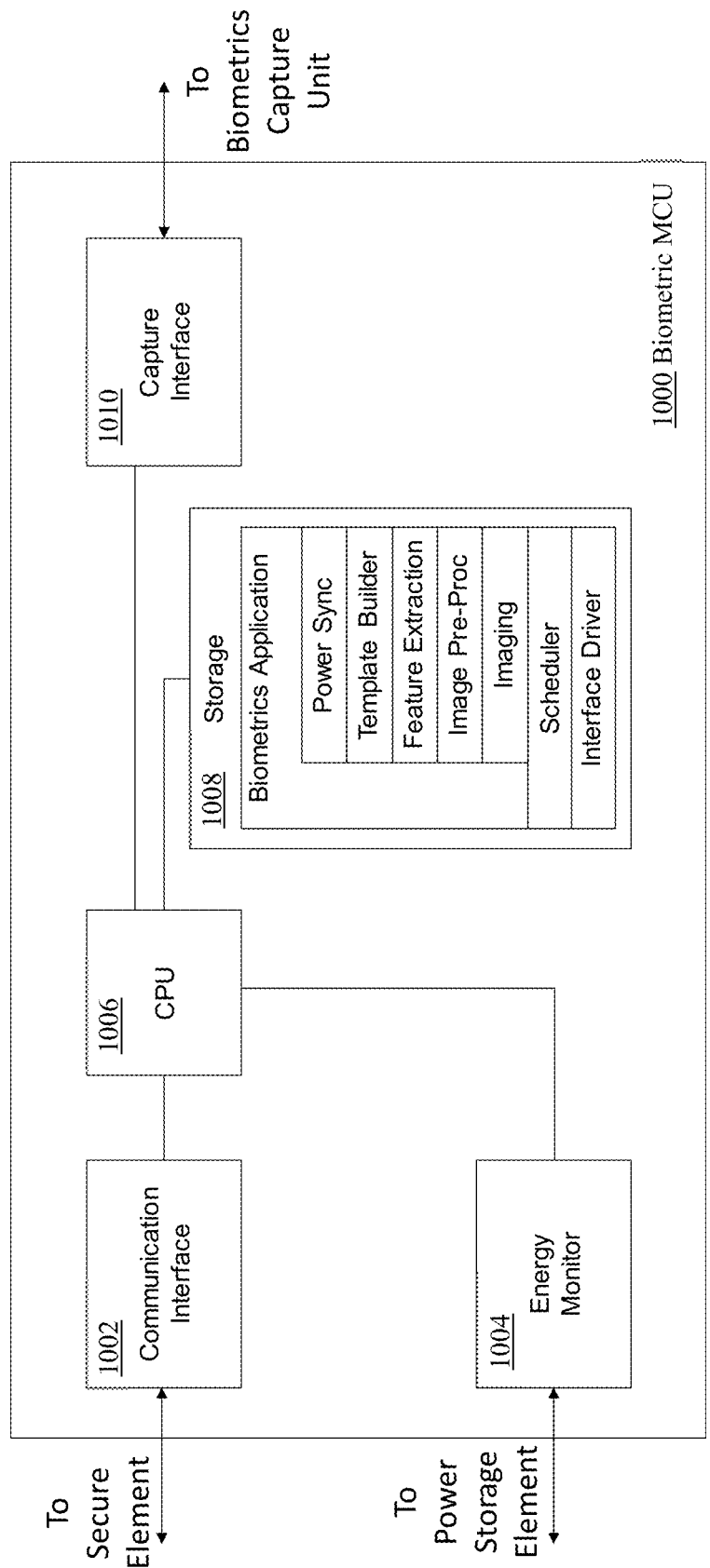
FIG. 10 shows an illustrative embodiment of a biometric processing unit.

FIG. 10 shows an illustrative embodiment of a biometric processing unit 1000, in particular a microcontroller for processing a biometric sample received from a biometric capturing unit (not shown). The biometric processing unit 1000 comprises a communication interface 1002, an energy monitor 1004, a central processing unit 1006, a storage unit 1008, and an interface 1010 to the biometric capturing unit.

The biometric MCU 1000, which may form part of a biometric sub-system, thus comprises a CPU 1006, a storage unit 1008 that may be ROM and/or RAM, a communication interface 1002 for operational coupling to an SE (not shown), a capture interface 1010 for operational coupling to a biometric capturing unit, and an energy monitor 1004 for measuring directly or indirectly the energy provided by a power conditioner and energy storage unit (not shown). For responding to non-periodic power shortages, the energy monitor 1004 may monitor the amount of energy stored within the power conditioner and energy storage unit. Monitoring of the energy may e.g. be implemented by means of a voltage sensor that measures the voltage across a charge storage element of known capacity. In that case, the measured voltage and the known capacity of the storage element may determine the power that could be provided by the energy storage unit. In case of a power shortage, the measures as taken during the occurrence of a WTX interval may be applied as well, meaning that the biometric MCU and if required the biometric capturing unit may be directly or indirectly configured into a sleep or clock-stop mode while the power shortage condition exists. In case the power shortage condition still allows operation of the biometric MCU and/or the biometric capturing unit, the biometric MCU and/or the biometric capturing unit may be configured into a less power consuming state, which may e.g. be achieved by reducing their clock frequencies. If the power shortage condition ceases to exist, the biometric MCU and/or the biometric capturing unit may be configured to operate at a processing speed that is supported by the available power level. Thus, a biometrically authenticated transaction may be processed at the highest possible processing speed as supported by the currently provided power.

Figure 11:
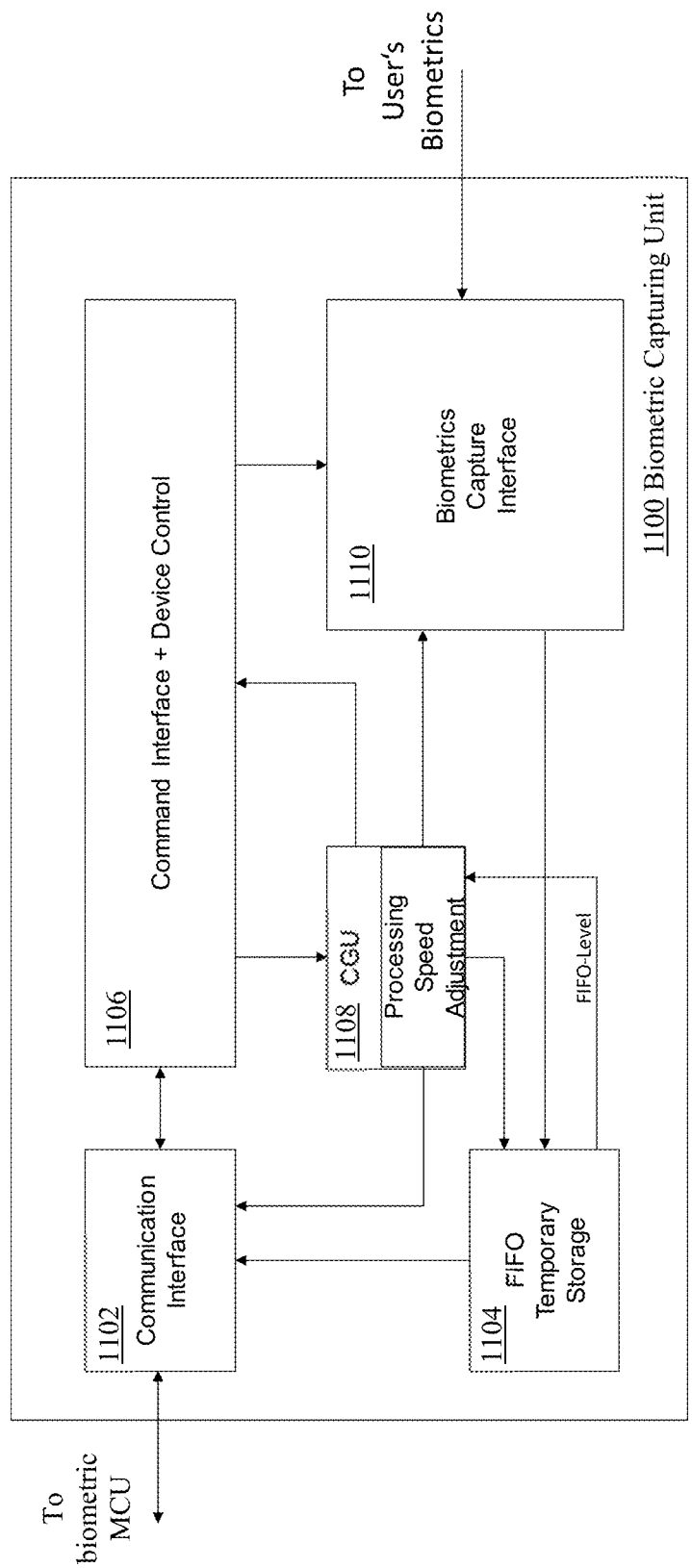
FIG. 11 shows an illustrative embodiment of a biometric capturing unit.

FIG. 11 shows an illustrative embodiment of a biometric capturing unit 1100. The biometric capturing unit 1100 comprises a communication interface 1102, a temporary storage unit 1104 implemented as a FIFO buffer, a command interface and device control unit 1106, a clock generation unit 1108, and a biometric capturing interface 1110. The biometric capturing interface 1100 may be interface to a biometric sensor (not shown), for example to a capacitive fingerprint sensor. Alternatively, the biometric capturing interface 1100 may include a biometric sensor, for example a fingerprint sensor that may be coupled to a finger during a user authentication process.

The biometric capturing unit 1100, which may form part of a biometric sub-system, comprises a command interface and device control unit 1106 for receiving configuration information and for configuring the operation of the biometric capturing unit 1100 in response to said configuration information. Furthermore, the biometric capturing unit 1100 comprises a communication interface for operational coupling to a biometric MCU (not shown) with the purpose of translating a biometric sample into a series of machine-readable contrast elements, a biometric capturing interface 1110, and a clock generation unit (CGU) 1108 providing the time base for operation of the biometric capturing unit 1108 and enabling an adjustment of the processing speed of operationally coupled components down to a full clock-stop. Furthermore, the biometric capturing unit 1100 comprises a cyclic memory that may be organized as a first-in-first-out (FIFO) buffer and configured to temporarily store said machine-readable contrast elements and to signal its loading status to said CGU 1108 with the purpose of adapting the CGU 1108 to the FIFO-level.

The biometric capturing unit 1100, which may form part of a biometric sub-system, comprises a command interface and device control unit 1106 for receiving configuration information and for configuring the operation of the biometric capturing unit 1100 in response to said configuration information. Furthermore, the biometric capturing unit 1100 comprises a communication interface for operational coupling to a biometric MCU (not shown) with the purpose of translating a biometric sample into a series of machine-readable contrast elements, a biometric capturing interface 1110, and a clock generation unit (CGU) 1108 providing the time base for operation of the biometric capturing unit 1108 and enabling an adjustment of the processing speed of operationally coupled components down to a full clock-stop. Furthermore, the biometric capturing unit 1100 comprises a cyclic memory that may be organized as a first-in-first-out (FIFO) buffer and configured to temporarily store said machine-readable contrast elements and to signal its loading status to said CGU 1108 with the purpose of adapting the CGU 1108 to the FIFO-level.

Figure 12:
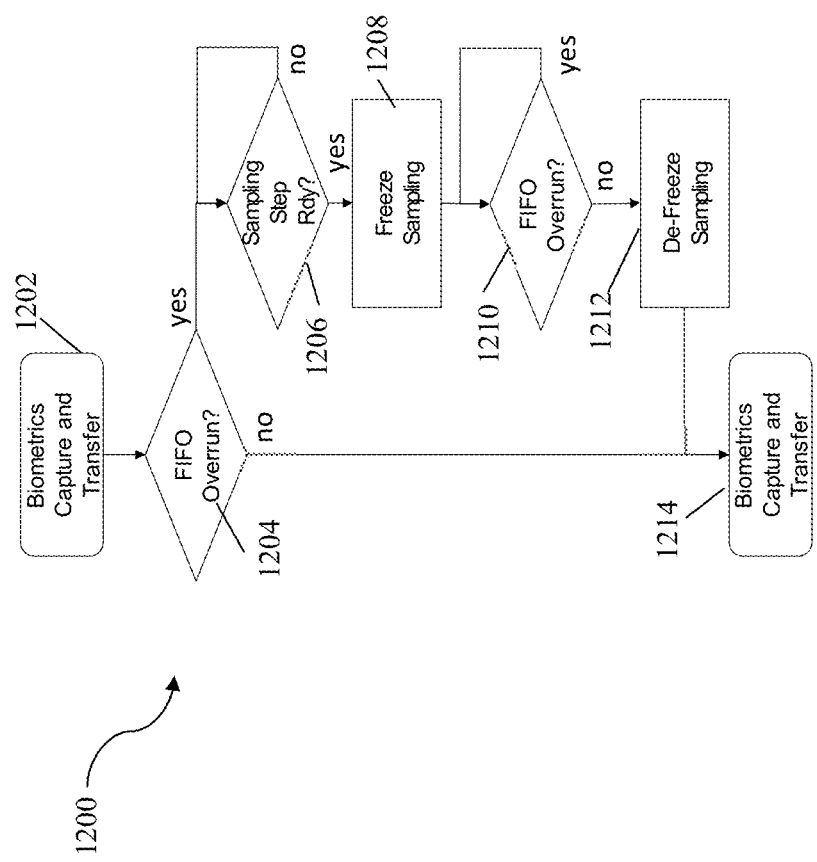
FIG. 12 shows an illustrative embodiment of a clock adaptation of a biometric capturing unit.

FIG. 12 shows an illustrative embodiment of a clock adaptation process 1200 of a biometric capturing unit of the kind set forth. In response to the data transfer rate configured by the biometric MCU, the FIFO of the biometric capturing unit may adjust the operating speed (i.e., the processing speed) of the biometric capturing unit to match the data transfer rate to the biometric MCU. In some embodiments, the processing speed control of the biometric capturing interface, the FIFO and the communication interface may follow the flow as shown in FIG. 12, wherein speed adjustment may only be feasible by stopping and enabling a clock signal. In this case, and as soon as the biometric MCU starts reading data from the biometric capturing unit, the overrun condition of said FIFO may cease to exist and thus the clock for the biometric capturing interface, the FIFO and the communication interface may be re-asserted.

An authentication token of the kind set forth may take different forms and may be used for various purposes. For example, the token may be an internet-of-things (IoT) device that communicates via a Bluetooth low energy (BLE) communication interface. In other examples, the token may be functionally embedded into a vehicle, e.g. a car, and communication may take place through a wireless wide area network (WAN). Furthermore, the token may be functionally embedded into a device that provides a paid service to a user, wherein payment is carried out through an operationally connected payment network. In some embodiments, the token may be a smart card. In other embodiments, the token may be a smart wearable device, such as a smart watch. In some embodiments, the energy monitor may be an analog-to-digital converter (ADC) embedded in the biometric sub-system, specifically in the biometric MCU. In some embodiments, the biometric capturing unit may be embedded in a touch screen. In some embodiments, an interface driver coupling the hardware interface between the SE and biometric MCU may be executed in a secure box, wherein the term "secure box" refers to a protected execution environment for application code that is monitored for security intrusion by the SE while code is being executed. Thus, the interface between the SE and the biometric MCU does not allow interference with any code of the payment application executed by the SE. In some embodiments, the matching component may be configured as executable code that is executed in a secure box. In some embodiments, the SE may be configured to operate at a lower processing speed with the purpose of reducing its power demand while the SE may be waiting for the biometric template to be made available by the biometric sub-system. In some embodiments, the biometric capturing unit may communicate with the biometric MCU through an I3C interface. In other embodiments, the biometric capturing unit may communicate with the biometric MCU through a SPI interface.

Figure 13:
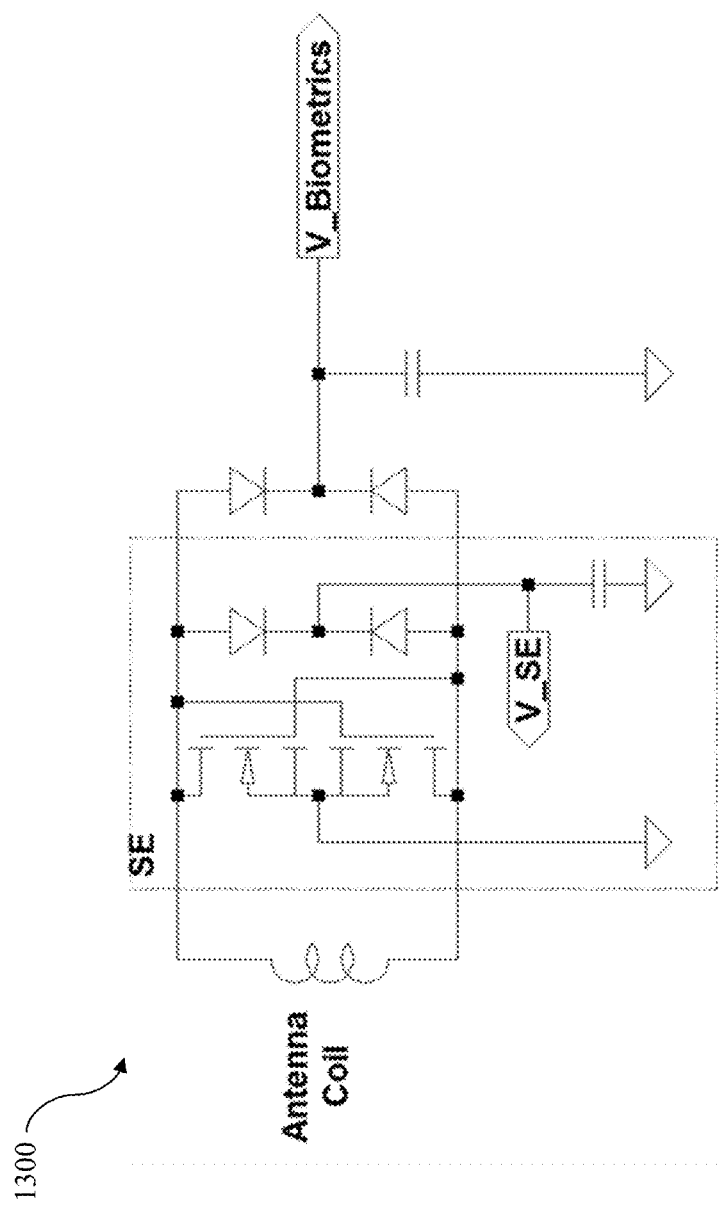
FIG. 13 shows an illustrative embodiment of a power conditioner and energy storage unit.

FIG. 13 shows an illustrative embodiment of a power conditioner and energy storage unit 1300. In particular, if the communication protocol is an ISO/IEC 14443 protocol, the power conditioner and energy storage unit 1300 may be implemented as shown in FIG. 13. The cathode path of a full-wave rectifier is represented by two controlled NMOSTs included in the SE, which may be used as common ground potential connection and only the anode paths of the SE and biometrics sub-system may be decoupled by individual diode paths, thus resulting in a very power efficient energy harvesting scheme. The power storage element may be a suitable capacitor that is operatively coupled to the voltage V_Biometrics.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 authentication token
102 communication unit
104 processing unit
106 biometric capturing unit
108 energy storage unit
110 synchronization unit
112 method of operating an authentication token
114 synchronization unit determines a communication status of the communication unit
116 synchronization unit determines a power supply capability of the energy storage unit
118 synchronization unit adjusts a processing speed of the processing unit in dependence on the communication status and the power supply capability
120 authentication system
122 payment network
124 token
126 biometric sub-system
128 biometric capturing unit
130 biometric processing unit (microcontroller)
132 secure element
134 power conditioner and energy storage unit
136 host
200 operation of a synchronization unit
202 biometric capturing unit
204 biometric MCU
206 secure element 208 host communication
210 power dropout?
212 energy storage
214 power shortage?
216 adjust processing speed
218 processing
220 transfer
222 FIFO
224 FIFO overrun?
226 adjust processing speed
228 data capture
300 operation of a biometric sub-system
302 operation of a biometric sub-system
304 operate biometric sub-system
306 WTX event?
308 freeze biometric sub-system
310 WTX active?
312 un-freeze biometric sub-system
314 operate biometric sub-system
316 operate biometric sub-system
318 power check event?
320 demand greater than supply?
322 increase processing speed of biometric sub-system
324 reduce processing speed of biometric sub-system
326 operate biometric sub-system
400 secure element
402 power conditioner and energy storage unit
404 host communication interface
406 cryptographic unit
408 central processing unit
410 tamper detection and access control unit
412 secure storage unit
414 biometric sub-system interface
500 biometric authentication sequence
502 host
504 secure element
506 biometric sub-system
508 biometric authentication
510 matching
514 authenticated
600 biometric coupling positive sequence
602 host
604 secure element
606 biometric MCU
608 biometric capturing unit
610 user
700 biometric coupling negative sequence
702 host
704 secure element
706 biometric MCU
708 biometric capturing unit
710 user
800 power shortage during communication
900 authenticated transaction
902 biometric capturing unit
904 biometric processing unit (microcontroller)
906 secure element
1000 biometric processing unit (microcontroller)
1002 communication interface
1004 energy monitor
1006 central processing unit
1008 storage unit
1010 capture interface
1100 biometric capturing unit
1102 communication interface
1104 first-in-first-out temporary storage
1106 command interface and device control
1108 clock generation unit
1110 biometrics capture interface
1200 clock adaptation of biometric capturing unit
1202 biometric sample capture and transfer
1204 FIFO overrun?
1206 sampling step ready?
1208 freeze sampling
1210 FIFO overrun?
1212 de-freeze sampling
1214 biometric sample capture and transfer
1300 power conditioner and energy storage unit

The invention claimed is:

1. An authentication token comprising:
a communication unit configured to perform contactless communication between the token and an external device;
an energy storage unit configured to store storing electrical energy;
a biometric capturing unit configured to capture at least one biometric sample, the biometric sample including at least one biometric feature representing an individual's identity, wherein the at least one biometric feature comprises a physical characteristic unique to the individual; and
a processing unit configured to process the biometric sample captured by the biometric capturing unit;
wherein the token further comprises a synchronization unit configured to:
determine a communication status of the communication unit;
determine a power supply capability of the energy storage unit; and
adjust a processing speed of the processing unit in dependence on said communication status and said power supply capability.

2. The token of claim 1, wherein the synchronization unit is further configured to adjust an operating speed of the biometric capture unit in dependence on said communication status and said power supply capability.

3. The token of claim 1, wherein the synchronization unit is further configured to halt the processing by the processing unit if the communication status indicates that no communication takes place or that the communication is unstable.

4. The token of claim 3, wherein halting the processing by the processing unit causes an overflow of a buffer of the biometric capturing unit, such that the operation by the biometric capturing unit is halted.

5. The token of claim 1, wherein the synchronization unit is further configured to reduce the processing speed of the processing unit if the power supply capability falls below a predefined, first threshold.

6. The token of claim 1, wherein the synchronization unit is further configured to increase the processing speed of the processing unit if the power supply capability rises above a predefined, second threshold.

7. The token of claim 1, wherein the communication status may be indicative of a wait time extension, WTX, event, and wherein the synchronization unit is further configured to halt the processing by the processing unit if the communication status indicates a WTX event.

8. The token of claim 1, wherein the synchronization unit is a functional unit that is distributed over the processing unit, the biometric capturing unit, and a secure element of the token.

9. The token of claim 8, wherein the secure element is configured to monitor the communication status.

10. The token of claim 8, wherein the secure element is configured to transmit wait time extension, WTX, messages to an external host.

11. The token of claim 1, wherein the communication status is indicative of a power dropout condition.

12. The token of claim 1, wherein the processing unit is a microcontroller.

13. The token of claim 1, being a wearable device, an internet-of-things device, or a smart card.

14. The authentication token of claim 1, wherein the processing unit is configured to process the biometric sample at the processing speed determined by the synchronization unit.

15. A method of operating an authentication token, said token comprising:
- a communication unit for contactless communication between the token and an external device;
- an energy storage unit for storing energy;
- a biometric capturing unit configured to capture at least one biometric sample;
- a processing unit configured to processing the at least one biometric sample captured by the biometric capturing unit; and
- a synchronization unit;
- wherein the method comprises causing the synchronization unit to:
  - determine a communication status of the communication unit;
  - determine a power supply capability of the energy storage unit; and
  - adjust a processing speed of the processing unit in dependence on said communication status and said power supply capability.

16. A computer program product comprising a non-transitory storage medium, the non-transitory storage medium comprising executable instructions configured, when executed by processing circuitry of an authentication token, to cause the authentication token to:
- determine a communication status of a communication unit coupled to the processing circuitry;
- determine a power supply capability of an energy storage unit of the authentication token;
- receive at least one biometric sample from a biometric capturing unit of the authentication token coupled to the processing circuitry, the at least one biometric sample including at least one biometric feature representing an individual's identity, wherein the at least one biometric feature comprises a physical characteristic unique to the individual; and
- determine a processing speed with which to process the at least one biometric sample based on the communication status and the power supply capability; and
- process the at least one biometric sample in accordance with the determined processing speed.

* * * * *